United States Patent
Mei et al.

(10) Patent No.: US 8,080,347 B2
(45) Date of Patent: Dec. 20, 2011

(54) CATALYST FOR POLYMER SOLID ELECTROLYTE FUEL CELL, MEMBRANE ELECTRODE ASSEMBLY, AND FUEL CELL

(75) Inventors: Wu Mei, Yokohama (JP); Taishi Fukazawa, Fuchu (JP); Takahiro Sato, Kawasaki (JP); Itsuko Mizutani, Yokohama (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 804 days.

(21) Appl. No.: 12/049,739

(22) Filed: Mar. 17, 2008

(65) Prior Publication Data
US 2008/0241639 A1    Oct. 2, 2008

(30) Foreign Application Priority Data

Mar. 27, 2007 (JP) ................. 2007-082185

(51) Int. Cl.
| | |
|---|---|
| H01M 4/02 | (2006.01) |
| H01M 4/36 | (2006.01) |
| H01M 4/90 | (2006.01) |
| H01M 4/94 | (2006.01) |
| H01M 4/62 | (2006.01) |
| B01J 21/00 | (2006.01) |

(52) U.S. Cl. ........ 429/528; 429/524; 429/525; 429/532; 502/232; 502/262

(58) Field of Classification Search ............. 429/528, 429/524, 525, 532; 502/232, 262
See application file for complete search history.

(56) References Cited

U.S. PATENT DOCUMENTS

| | | | |
|---|---|---|---|
| 3,506,494 A | 4/1970 | Adlhart | |
| 5,872,074 A | 2/1999 | Schulz et al. | |
| 2004/0072061 A1* | 4/2004 | Nakano et al. | 429/44 |
| 2007/0003823 A1* | 1/2007 | Mei et al. | 429/44 |

FOREIGN PATENT DOCUMENTS

| | | |
|---|---|---|
| JP | 2006-128118 | 5/2006 |
| JP | 2006-278217 | 10/2006 |
| WO | WO 2004/022209 A2 | 3/2004 |
| WO | WO 2005/119828 A2 | 12/2005 |

OTHER PUBLICATIONS

U.S. Appl. No. 12/121,282, filed May 15, 2008, Fukazawa, et al.
U.S. Appl. No. 12/050,497, filed Mar. 18, 2008, Mizutani, et al.
Office Action issued on Jan. 29, 2010, in Korean Application No. 10-2008-0020866 (with an English Translation).
U.S. Appl. No. 12/201,332, filed Aug. 29, 2008, Tamura, et al.

\* cited by examiner

*Primary Examiner* — Patrick Ryan
*Assistant Examiner* — Julian Anthony
(74) *Attorney, Agent, or Firm* — Oblon, Spivak, McClelland, Maier & Neustadt, L.L.P.

(57) ABSTRACT

There is provided a catalyst for a fuel cell, which simultaneously realizes excellent catalytic activity and catalytic stability. The catalyst for a fuel cell comprises a fine particle of a metal represented by formula:

$$Pt_xRu_ySi_zT1_u$$

wherein T1 represents at least one element selected from the group consisting of nickel (Ni), tungsten (W), vanadium (V), and molybdenum (Mo); x=30 to 90 atomic %; y=0 to 50 atomic %; z=0.5 to 20 atomic %; and u=0.5 to 40 atomic %, or comprises a fine particle of a metal represented by formula:

$$Pt_xRu_ySi_zT2_u$$

wherein T2 represents at least one element selected from the group consisting of hafnium (Hf), tin (Sn), zirconium (Zr), niobium (Nb), titanium (Ti), tantalum (Ta), chromium (Cr), and aluminum (Al); x=30 to 90 atomic %; y=0 to 50 atomic %; z=0.5 to 20 atomic %; and u=0.5 to 40 atomic %.

17 Claims, 1 Drawing Sheet

CATALYST FOR POLYMER SOLID ELECTROLYTE FUEL CELL, MEMBRANE ELECTRODE ASSEMBLY, AND FUEL CELL

CROSS-REFERENCE TO RELATED APPLICATIONS

This application is based upon and claims the benefit of priority from the prior Japanese Patent Application No. 2007-82185, filed on Mar. 27, 2007; the entire contents of which are incorporated herein by reference.

BACKGROUND OF THE INVENTION

The present invention relates to a catalyst for a fuel cell, particularly a catalyst for a polymer solid electrolyte fuel cell, and a membrane electrode assembly and a fuel cell using the catalyst.

Solid polymer fuel cells, particularly methanol-type solid polymer fuel cells using a methanol solution as a fuel, can be operated at a low temperature and can realize a reduction in size and a reduction in weight and thus have recently drawn attention as a power supply, for example, for mobile equipment, and research and development thereof have been forwarded.

The performance of conventional fuel cells, however, is unsatisfactory for wide spreading. In fuel cells, chemical energy is converted to electric power by an electrode catalyst reaction, and high-activity catalysts are indispensable for the development of high-performance fuel cells.

Up to now, PtRu has generally been used as a catalyst for an anode electrode in fuel cells. The voltage loss by the PtRu catalyst is about 0.3 V with respect to the theoretical voltage 1.21 V of the electrode catalyst reaction, and anode catalysts having a higher activity (methanol oxidation activity) than the catalytic activity of the PtRu have been desired. From this viewpoint, in order to improve the methanol oxidation activity of the PtRu catalyst, various studies, for example, on the addition of other elements to the PtRu, have been made.

For example, U.S. Pat. No. 3,506,494 describes the effect attained by the addition of ten metals such as tungsten and tantalum, and JP-A 2006-278217 refers to the effect attained by the addition of silicon (Si), aluminum (Al), titanium (Ti) and the like. However, it should be noted that the reaction field in the catalyst reaction is present on the surface of nano-size catalyst particles, and, since several atomic layers on the catalyst surface substantially govern the catalyst activity, the surface state of the catalyst possibly varies depending upon the catalyst synthesis process even when the composition of the catalyst is identical. Up to now, solution methods such as immersion methods have generally been used for the catalyst synthesis. The solution methods, however, suffer from a problem that, for elements which are resistant to reduction and are hardly alloyed, the control of the catalyst surface is difficult.

On the other hand, the synthesis of catalysts by sputtering or vapor deposition is more advantageous than the solution method from the viewpoint of the control of the material. At the present time, however, the influence of a change in conditions such as the type of elements, catalyst composition, substrate material, and substrate temperature, on a catalyst production process has not been fully studied. Since the catalyst for fuel cells is nanoparticles, the surface electron state of catalyst particles and the nanostructure of the particles greatly depend upon the type and addition amount of elements added, and, thus, it is considered that, in order to realize high activity and high stability, the type of addition elements, the amount of elements added, and a combination of addition elements should be optimized. To this end, in PCT Publication No. 2005-532670, studies have been made on a production process by sputtering, and finding on elements other than Pt and Ru is described. Further, JP-A 2006-128118 discloses a catalyst comprising a compound, selected from silicon, aluminum, and titanium, added to a catalyst metal.

In all the above prior art techniques, studies on the influence of the catalyst composition on the catalyst activity are unsatisfactory, and the provision of an improved catalyst for a fuel cell, which is excellent in both methanol oxidation activity and catalyst stability, has been still desired.

BRIEF SUMMARY OF THE INVENTION

In view of the above problems of the prior art, the present invention has been made, and an object of the present invention is to provide a catalyst for a fuel cell, which is excellent in both catalyst activity and catalyst stability.

The above object can be attained by a catalyst for a fuel cell, comprising a metallic fine particle represented by formula:

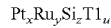

$$Pt_xRu_ySi_zT1_u$$

wherein T1 represents at least one element selected from the group consisting of nickel (Ni), tungsten (W), vanadium (V), and molybdenum (Mo); x=30 to 90 atomic %; y=0 to 50 atomic %; z=0.5 to 20 atomic %; and u=0.5 to 40 atomic %.

In a preferred embodiment of the present invention, the area of a peak attributable to an oxygen bond of silicon (Si) in a spectrum measured by X-ray photoelectron spectroscopy (XPS) is not more than 200% of the area of a peak attributable to a metal bond of a silicon element. More preferably, the area of a peak attributable to an oxygen bond of the element T1 in a spectrum measured by X-ray photoelectron spectroscopy (XPS) is not more than 200% of the area of a peak attributable to a metal bond of the same element.

According to the present invention, there is provided a catalyst for a fuel cell, comprising a metallic fine particle represented by formula:

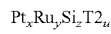

$$Pt_xRu_ySi_zT2_u$$

wherein T2 represents at least one element selected from the group consisting of hafnium (Hf), tin (Sn), zirconium (Zr), niobium (Nb), titanium (Ti), tantalum (Ta), chromium (Cr), and aluminum (Al); x=30 to 90 atomic %; y=0 to 50 atomic %; z=0.5 to 20 atomic %; and u=0.5 to 40 atomic %.

In the above embodiment, preferably, the area of a peak attributable to an oxygen bond of silicon (Si) in a spectrum measured by X-ray photoelectron spectroscopy (XPS) is not more than 200% of the area of a peak attributable to a metal bond of a silicon element, or the area of a peak attributable to a metal bond of the element T2 in a spectrum measured by X-ray photoelectron spectroscopy (XPS) is not more than 200% of the area of a peak attributable to an oxygen bond of the same element.

The present invention includes a supported catalyst for a fuel cell, comprising a carrier and the above catalyst supported on the carrier, a membrane electrode assembly comprising the supported catalyst, and a fuel cell comprising the membrane electrode assembly.

The present invention can provide a catalyst for a fuel cell, which is excellent in both catalyst activity and catalyst stability.

DETAILED DESCRIPTION OF THE INVENTION

Figure 1:
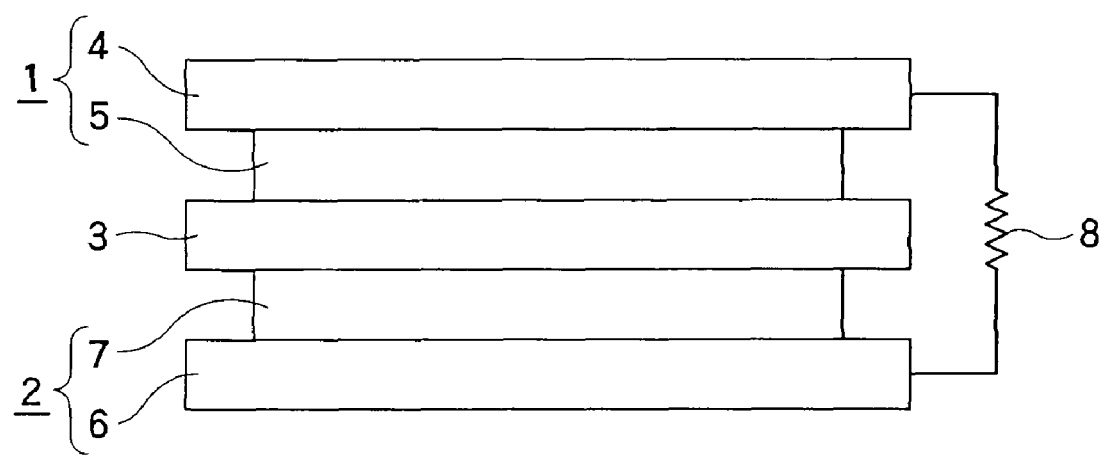
FIG. 1 is a typical side view of a fuel cell in one embodiment of the present invention.

As described above, the catalyst for a fuel cell according to the first invention comprises a metallic fine particle represented by formula:

$$Pt_xRu_ySi_zT1_u$$

wherein T1 represents at least one element selected from the group consisting of nickel (Ni), tungsten (W), vanadium (V), and molybdenum (Mo); x=30 to 90 atomic %; y=0 to 50 atomic %; z=0.5 to 20 atomic %; and u=0.5 to 40 atomic %.

The catalyst for a fuel cell according to the second invention comprises a metallic fine particle represented by formula:

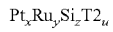
$$Pt_xRu_ySi_zT2_u$$

wherein T2 represents at least one element selected from the group consisting of hafnium (Hf), tin (Sn), zirconium (Zr), niobium (Nb), titanium (Ti), tantalum (Ta), chromium (Cr), and aluminum (Al); x=30 to 90 atomic %; y=0 to 50 atomic %; z=0.5 to 20 atomic %; and u=0.5 to 40 atomic %.

Thus the present invention is characterized in that silicon and an element T have been added in combination to a specific noble metal and, at the same time, the content ratio of the these elements has been limited to a specific range. As shown in the results of Examples and Comparative Examples which will be described later, a combination of the composition and the content ratio could have realized the provision of a catalyst for a fuel cell, which is excellent in both catalyst activity and catalyst stability.

The present invention will be described in conjunction with preferred embodiments.

In the catalyst according to the present invention, platinum (Pt) is a main catalyst element. Platinum is very effective for the oxidation of hydrogen and a dehydrogenation reaction of an organic fuel. When the amount of the platinum is excessively small, the catalyst activity is lowered. Accordingly, in the above formula, the content x of Pt is preferably 30 to 90 atomic %, more preferably 40 to 85 atomic %. Ruthenium (Ru) is effective for the suppression of CO poisoning, and the content y of ruthenium is preferably 0 to 50 atomic %, more preferably 0 to 45 atomic %. In the catalyst of the present invention, even when the content of ruthenium is low or zero, satisfactory catalyst activity can be obtained. Further, replacement of a part of platinum with other metal sometimes improves the activity. Since the noble metal has excellent chemical stability, when replacement is contemplated, replacement, for example, with rhodium (Rh), osmium (Os), or iridium (Ir) is preferred.

In the present invention, silicon, and element T1 or element T2 (the elements T1 and T2 being hereinafter collectively referred to as element T) function as a cocatalyst. Element T is at least one element selected from the group consisting of nickel (Ni), tungsten (W), vanadium (V), hafnium (Hf), tin (Sn), zirconium (Zr), niobium (Nb), molybdenum (Mo), titanium (Ti), tantalum (Ta), chromium (Cr), and aluminum (Al). In the present invention, as described above, it was found that, when silicon and element T are added in combination to the Pt—Ru-based component, the combination can improve both activity and stability to a high level in a good balance.

The mechanism through which the activity is enhanced, as not been fully elucidated yet. However, in the combination n a specific composition, it is considered that the participation f the coexistence of a silicon element, an element T and a noble metal is important in the enhanced activity, and it is further considered that the nanostructure, surface structure, and electron state of catalyst fine particles attributable to the coexistence can render the catalyst activity high.

From this viewpoint, regarding silicon, the area of the peak attributable to an oxygen bond of silicon in the catalyst is preferably not more than 200% of the area of the peak attributable to the metal bond of the silicon element, particularly preferably not more than 150%, most preferably not more than 80%. When the area ratio in this case exceeds 200%, the catalyst activity is disadvantageously significantly lowered.

Also for element T, from the viewpoint of simultaneously realizing both high activity and high stability in a good balance, it is important that the element T be in a proper state of element. From this viewpoint, for element T1 (Ni, W, V, or Mo element), the area of the peak attributable to the oxygen bond of the same element in a spectrum as measured by X-ray photoelectron spectroscopy (XPS) is preferably not more than 200% of the area of the peak attributable to the metal bond of the same element, particularly preferably not more than 120%, most preferably not more than 80%. Further, for element T2 (Sn, Hf, Zr, Nb, Ti, Ta, Cr, or Al element), the area of the peak attributable to the metal bond in a spectrum as measured by X-ray photoelectron spectroscopy (XPS) is preferably not more than 200% of the area of the peak attributable to the oxygen bond of the same element, particularly preferably not more than 120%, most preferably not more than 80%. In both the cases, bringing the area ratio to not more than 200% can improve the catalyst activity or stability.

In the present invention, the term "peak area" as used herein refers to the integral value of a binding energy axis of a part obtained by subtracting a signal background from a peak attributable to the element in the XPS spectrum. When there is an overlap of peaks, the area of the peak belonging to the element can be determined by conducting peak separation.

Further, in the present invention, the content z of silicon in the catalyst is preferably 0.5 to 20 atomic %, more preferably 1 to 15 atomic %. When the Si content is less than 0.5 atomic %, the cocatalyst action of silicon is insufficient. On the other hand, when the Si content exceeds 20 atomic %, the number of major active sites constituted by the platinum and ruthenium atoms is significantly reduced resulting in lowered catalyst activity.

Furthermore, in the present invention, the content u of element T in the catalyst is preferably 0.5 to 40 atomic %, more preferably 1 to 30 atomic %, most preferably 1 to 20 atomic %. When the content u of element T is outside the range of 0.5 to 40 atomic %, the catalyst activity and the stability cannot be simultaneously realized without difficulties.

When tin (Sn) is contained, the Sn content is preferably in the range of 0.5 to 10 atomic %, most preferably 1 to 8 atomic %. When the Sn content is less than 0.5 atomic % or more than 10 atomic %, the cocatalyst activity of tin is lowered.

In the catalyst according to the present invention, metal elements other than described above, particularly, at least one metal selected from manganese (Mn), iron (Fe), cobalt (Co), gold (Au) and copper (Cu) can be additionally added. The addition of these metal elements in combination sometimes contributes to an improvement in activity. The addition amount is preferably in the range of 2 to 20 atomic %.

Further, in the catalyst according to the present invention, oxygen can be contained. In the course of the synthesis process, metal components of the catalyst surface are unavoidably oxidized by the adsorption of oxygen on the surface of the catalyst in storing the catalyst, or by surface oxidation treatment such as acid washing. In the present invention, however, it was found that the production of a small amount of oxide on the surface can improve the activity and stability of the catalyst. Accordingly, in the present invention, the presence of the oxide is positively accepted. From this viewpoint, the content of oxygen in the catalyst according to the present invention is preferably not more than 15 atomic %. When the content of oxygen in the catalyst exceeds 15 atomic %, the catalyst activity is adversely affected.

In the catalyst according to the present invention, the presence of not more than 0.1 atomic % of impurity elements, for example, phosphorus (P), sulfur (S), and chlorine (Cl) is tolerable. There is a possibility that these elements are included during the production of the catalyst or membrane electrode assembly, or during the treatment process. It is considered that, when the content of these elements is not more than 0.1 atomic %, the properties of the catalyst according to the present invention are not significantly deteriorated. Also from this viewpoint, it can be said that the level of the acceptability of the surface structure of the catalyst according to the present invention is high.

The particle diameter of the catalyst according to the present invention is not particularly limited. When the particles are nano fine particles, the highest activity can be realized. Accordingly, the average particle diameter of the catalyst particles according to the present invention is preferably not more than 10 nm. This is because, when the average particle diameter of the catalyst particles is not more than 10 nm, the active efficiency of the catalyst can be improved. The average particle diameter is more preferably in the range of 0.5 to 10 nm. An average particle diameter of not less than 0.5 nm facilitates the regulation of the catalyst synthesis process and is also advantageous in cost.

Fine particles having an average particle diameter of not more than 10 nm may be used solely as the catalyst particles. Alternatively, aggregates (secondary particles) of primary particles formed of the fine particles may also be used.

The present invention embraces the form of a supported catalyst comprising the above catalyst supported on a carrier. In this case, the carrier may be an electroconductive carrier. For example, carbon black may be mentioned as the electroconductive carrier. The electroconductive carrier, however, is not limited to carbon black, and any conventional carrier may be properly used so far as the carrier has excellent electroconductivity and stability. In recent years, nanocarbon materials, for example, fiber-, tube-, or coil-shaped nanocarbon materials have been developed. The activity is possibly further improved by supporting catalyst particles to be used in the present invention on these materials having different surface states. Carriers other than carbon materials usable herein include electroconductive ceramic materials. In this case, a further synergistic effect can be expected by the ceramic carrier and the catalyst particles.

Next, the production process of a supported catalyst according to the present invention will be described. The supported catalyst according to the present invention may be produced, for example, by sputtering or vapor deposition. As compared with solution methods such as impregnation methods, precipitation methods, or colloid methods, these methods can more easily produce catalysts having a metal bond-containing specific mixed state. The supported catalyst according to the present invention cannot be produced by conventional solution methods without difficulties. In a method, which comprises preparing a metal bond-containing polynuclear complex of Pt and Ru with T, impregnating a carrier with the polynuclear complex, and subjecting the impregnation product to reduction treatment, the synthesis of the polynuclear complex is difficult making it impossible to produce the supported catalyst according to the present invention. Further, the production cost would be increased. When the supported catalyst according to the present invention is produced by electrodeposition or electrophoresis, the control of nanoparticles is difficult and, thus, this method is expected to be disadvantageous in production cost. In sputtering or vapor deposition, an alloy target may be used. Alternatively, simultaneous sputtering or simultaneous vapor deposition may be carried out using metal targets of respective constituent elements.

A method for depositing catalyst particles on an electroconductive carrier by sputtering will be described. A particulate or fibrous electroconductive carrier is first satisfactorily dispersed. The dispersed carrier is then inserted in a holder provided in a champer of a sputtering device, and, while stirring in a predetermined direction, constituent metals of the catalyst is deposited on the carrier by sputtering. The temperature of the carrier during sputtering is preferably set at a temperature of 400° C. or below. When the setting temperature is excessively high, phase separation is likely to occur in catalyst particles and, consequently, the catalyst activity sometimes becomes unstable. The lower limit of the carrier temperature is preferably 10° C. from the viewpoint of reducing the cost necessary for cooling the carrier. The temperature of the carrier may be measured with a thermocouple. Further, stirring is important for realizing even deposition of the catalyst. When stirring is not carried out, the properties of the fuel cell are deteriorated due to uneven catalyst distribution.

The catalyst according to the present invention may also be produced by sputtering directly on an electroconductive carbon fiber-containing porous paper, an electrode diffusion layer, or an electrolyte film. In this case, the catalyst should be formed in the form of nano fine particles by regulating the process. Further, as in the above embodiment, preferably, the temperature of the porous paper is brought to 400° C. or below. In some cases, the activity can be further improved by a method in which, after the formation of catalyst particles by sputtering or vapor deposition, the catalyst particles are subjected to acid washing treatment, alkali treatment or heat treatment. The reason why the activity can be increased by this method is believed to reside in that the catalyst structure or surface structure is rendered more proper by the acid washing treatment, alkali treatment, or heat treatment. In the acid washing treatment, the use of an aqueous acid solution suffices for contemplated results. Preferably, however, an aqueous sulfuric acid solution is used. An aqueous alkali solution may be used for the alkali treatment. The heat treatment is preferably carried out at a temperature of 10 to 400° C. in an atmosphere of an oxygen partial pressure of less than 5%. Further, since fine particles are likely to be formed, other materials such as carbon material and constituent metal elements may be sputtered or vapor deposited simultaneously. In the present invention, a method may be adopted in which a method having high solubility, for example, copper (Cu) or zinc (Zn), and constituent metal elements may be sputtered or vapor deposited simultaneously followed by acid washing or the like to remove copper, zinc and the like.

The present invention includes a membrane electrode assembly comprising the above supported catalyst. The membrane electrode assembly (MEA) in a preferred embodiment of the present invention comprises an anode, a cathode, and a proton conductive film disposed between the anode and the cathode.

Further, the fuel cell in an embodiment of the present invention may comprise the above membrane electrode assembly.

FIG. 1 is a typical side view of a fuel cell in one embodiment of the present invention.

A membrane electrode assembly (MEA) shown in FIG. 1 comprises an anode 1, a cathode 2, and a proton conductive film 3. The anode 1 comprises a diffusion layer 4 and an anode catalyst layer 5 stacked on the diffusion layer 4. The cathode 2 comprises a diffusion layer 6 and a cathode catalyst layer 7 stacked on the diffusion layer 6. The anode 1 and the cathode 2 are stacked on top of each other so that the anode catalyst layer 5 faces the cathode catalyst layer 7 through the proton conductive film 3. In FIG. 1, reference character 8 designates an external circuit.

The anode catalyst layer contains the above catalyst. On the other hand, for example, platinum (Pt) may be used in the cathode catalyst contained in the cathode catalyst layer. The cathode catalyst may be supported on a carrier. Alternatively, the cathode catalyst may be used in an unsupported form. An electroconductive porous sheet may be used in the diffusion layer. The electroconductive porous sheet may be, for example, a sheet formed of an air or liquid permeable material, for example, a carbon cloth or a carbon paper.

The proton conductive material contained in the anode catalyst layer, the cathode catalyst layer, and the proton conductive film is not particularly limited so far as the material can conduct protons. Examples of proton conductive materials include, but not limited to, Nafion (manufactured by Du Pont (E.I.) de Nemours & Co.), Flemion (manufactured by Asahi Chemical Industry Co., Ltd.), Aciplex (manufactured by Asahi Glass Co., Ltd.) and other sulfonic acid group-containing fluororesins, and tungstic acid, phosphotungstic acid and other inorganic materials.

A fuel cell in an embodiment of the present invention comprises the above MEA, means for supplying a fuel to an anode, and means for supplying an oxidizing agent to a cathode. The number of MEAs may be one or at least two. The use of a plurality of MEAs can realize higher electromotive force. The fuel may be, for example, methanol, ethanol, formic acid, or an aqueous solution containing at least one material selected from methanol, ethanol, and formic acid.

EXAMPLES

The following Examples and Comparative Examples further illustrate the present invention.

Examples 1 to 20, Comparative Examples 1 to 18

A carbon black carrier (tradename: Vulcan XC72, specific surface area: about 230 $m^2/g$, manufactured by Cabot Corporation) was satisfactorily dispersed. The dispersed carrier was then placed in a holder provided in a champer in an ion beam sputter. The holder was evacuated. When the degree of vacuum reached not more than $3\times10^{-6}$ Torr, an Ar gas was allowed to flow into the champer. While stirring the carrier in such a state kept at 400° C. or below, sputtering was carried out using a metal or an alloy as a target so as to provide various compositions as shown in Table 1 to deposit catalyst particles to the carrier. The product was acid cleaned with an aqueous sulfuric acid solution (10 g of sulfuric acid and 200 g of water), was then washed with water and was dried.

Comparative Example 19

A supported catalyst having the same composition as described in patent JP-A 2006-278217 was produced in the same manner as in a working example described in this reference. At the outset, 500 mg of carbon black (tradename: Vulcan XC72, specific surface area: about 230 $m^2/g$, manufactured by Cabot Corporation) was added 1000 ml of an ethanol solution containing a compound (content in the solution: 100 mg in terms of silicon), and the mixture was thoroughly stirred for even dispersion. Thereafter, the dispersion liquid was then heated under stirring to 55° C. to evaporate and remove ethanol. Next, while allowing hydrogen gas to flow into the system at a rate of 50 ml/min, the residue obtained by the above method was heated at 300° C. for 3 hr to support vanadium on carbon black.

Next, 300 ml of a cyclohexane solution containing 1,5-cyclooctadienedimethylplatinum in an amount of 317.7 mg in terms of platinum metal, and 40 ml of an ethanol solution containing ruthenium chloride in an amount of 82.3 mg in terms of a ruthenium metal were mixed together. The above silicon-supported carbon was added to the mixed solution, and the mixture was thoroughly stirred for even dispersion. The dispersion was heated to 55° C. with stirring to evaporate and remove the solvent. Next, while allowing hydrogen gas to flow at a rate of 50 ml/min, the residue obtained by the above method was heated at 300° C. for 3 hr to support platinum, ruthenium and silicon on carbon black and thus to give supported catalysts.

Each catalyst was subjected to XPS with Quantum-2000 (manufactured by PHI). A neutralization gun (an electron gun, an argon gun) was used for charge-up compensation and charge correction (Cls: C—C=284.6 eV). For each element, identification of peaks attributable to metal bond and oxygen bond is shown in Table 2. For example, for a silicon element, an Si 2p spectrum was used, and a peak in a binding energy range of 99 to 100 eV was identified as attributable to a metal bond, and a peak in a binding energy of 103 to 104 eV was identified as attributable to an oxygen bond. When a plurality of types of element T are contained in the catalyst particle, the element T having the highest content is defined as a main element T. The results of measurement for a main element T (element T1 or element T2) for each catalyst are shown in Table 1.

The peak area ratio of the main element T1 was defined as an oxygen bond-derived peak area obtained by presuming the metal bond-derived peak area of the same element to be 100%, and the peak area ratio of the main element T2 was defined as the metal bond-derived peak area by presuming the oxygen bond-derived peak area of the same element to be 100%.

As shown in Table 1, it was confirmed that the oxygen bond-derived peak area of each main element T1 on an XPS spectrum in Examples 1 to 20 was not more than 200% of the metal bond-derived peak area of the same element, and the metal bond-derived peak area of each main element T2 was not more than 200% of the oxygen bond-derived peak area of the same element. It was found that the silicon element of Comparative Example 19 prepared by the solution method was substantially in an oxidized state. The above sample for the measurement is a catalyst which has been washed with an acid. The catalyst before the acid washing sometimes has a higher oxidization bond-derived peak than the acid washed catalyst. This is in many cases due to an unstable oxide layer, and it was confirmed that, when the acid washing process was not carried out, spontaneous conversion to a stable layer during power generation was observed, and the area ratio of the oxidization bond-derived peak was on the same level as the acid washed catalyst.

The average particle diameter of catalyst particles for each supported catalyst was measured for five desired different visual fields by observation under TEM. For each visual field, the diameters of 20 particles were measured, and the average of the diameters of the 100 particles in total was designated as the average particle diameter. The results are shown in Table 1 below.

The products of Examples 1 to 20 and Comparative Examples 1 to 19 were used as an anode catalyst in combination with a standard cathode electrode (a platinum (Pt) catalyst supported on carbon black, manufactured by Tanaka Kikinzoku Kogyo K.K.) to produce the following fuel cell electrodes, membrane electrode assemblies, and single cells which were then evaluated.

<Anode Electrode>

Various catalysts obtained above (3 g) were weighed. Each of the supported catalyst, together with 8 g of pure water, 15 g of a 20% Nafion solution, and 30 g of 2-ethoxyethanol, was thoroughly stirred and was dispersed to prepare slurries. The slurry was coated by a control coater on carbon paper subjected to treatment rendering the paper water repellent (350 μm, manufactured by Toray Industries, Inc.), and the coated paper was dried to produce an anode electrode of which the loading density of the noble metal catalyst was 1 mg/cm$^2$.

<Cathode Electrode>

A platinum (Pt) catalyst (2 g) manufactured by Tanaka Kikinzoku Kogyo K.K. was first weighed. The weighted catalyst, together with 5 g of pure water, 5 g of a 20% Nafion solution, and 20 g of 2-ethoxyethanol, was thoroughly stirred and was dispersed to prepare slurries. The slurry was coated by a control coater on carbon paper subjected to treatment rendering the paper water repellent (350 μm, manufactured by Toray Industries, Inc.), and the coated paper was dried to produce a cathode electrode of which the loading density of the noble metal catalyst was 2 mg/cm$^2$.

<Production of Membrane Electrode Assembly>

The cathode electrode and the anode electrode each were cut off to a size of 3.2×3.2 cm square (electrode area 10 cm$^2$). Nafion 117 (manufactured by Du Pont (E.I.)) as a proton conductive solid polymer film was held between the cathode electrode and the anode electrode followed by thermocompression bonding under conditions of temperature 125° C., time 10 min and pressure 30 kg/cm$^2$ to produce a membrane electrode assembly.

A single cell for a fuel direct supply-type polymer electrolyte fuel cell was produced by using this membrane electrode assembly and a passage plate. A 1 M aqueous methanol solution was supplied as a fuel into the anode cell in this single cell at a flow rate of 0.6 ml/min. At the same time, air was supplied into the cathode electrode at a flow rate of 200 ml/min. In such a state that the cell was maintained at 50° C., discharge was carried out at a current density of 100 mA/cm$^2$. Thirty min after the initiation of the discharge, the cell voltage was measured. The results are shown in Table 1 below. Regarding the high level of stability, power generation of the single cell was carried out under the above operating conditions for 500 hr for evaluation of the single cell using the percentage lowering in voltage at a current density of 100 mA/cm$^2$ as an index. The results are shown in Table 1 below.

As can be seen from the results shown in Table 1, a comparison of Examples 1 to 20 with Comparative Example 1 reveals that, as compared with the PtRu catalyst, the catalysts according to the present invention have a higher level of fuel cell properties and a stability comparable with the PtRu catalyst. A comparison of Example 1 to 20 with Comparative Examples 2 to 14 reveals that, when silicon or element T is added solely, a high level of fuel cell properties and a high level of stability could not be simultaneously realized. A comparison of Examples 1 and 2 with Comparative Examples 15 to 18 reveals that, when the addition amount of the silicon element is outside the range of 0.5 to 20 atomic %, or when the addition amount of the nickel (Ni) element is outside the range of 1 to 40 atomic %, a high level of activity and a high level of stability of not more than 1% in terms of percentage deterioration cannot be simultaneously realized. For other element systems, the same results could be obtained. A comparison of Example 1 with Comparative Example 19 reveals that, in order to realize a high level of activity, in addition to the composition, the regulation of the bound state of elements by the process is necessary.

It was confirmed that the same tendency as described above was observed in a reformed gas-type polymer electrolyte fuel cell using the catalyst according to the present invention. Accordingly, also for CO poisoning, the catalysts of the present invention is more effective than the conventional Pt—Ru catalyst.

TABLE 1

| | Catalyst composition | Si peak area ratio (%) (1) | Main element T1 peak area ratio A (%) (2) | Main element T2 peak area ratio B (%) (3) | Voltage (V) | Deterioration rate (%) |
|---|---|---|---|---|---|---|
| Ex. 1 | $Pt_{40}Ru_{30}Si_{10}Ni_{20}$ | About 50 | 20 | — | 0.50 | 0.9 |
| Ex. 2 | $Pt_{44}Ru_{40}Si_1Ni_{15}$ | <20 | 20 | — | 0.49 | 0.7 |
| Ex. 3 | $Pt_{50}Ru_{41}Si_3W_6$ | <20 | 20 | — | 0.48 | 0.7 |
| Ex. 4 | $Pt_{90}Si_5V_5$ | About 30 | 40 | — | 0.46 | 0.6 |
| Ex. 5 | $Pt_{50}Ru_{42}Si_3Mo_5$ | About 30 | 30 | — | 0.47 | 0.8 |
| Ex. 6 | $Pt_{50}Ru_{40}Si_5Sn_5$ | About 60 | — | 30 | 0.48 | 0.9 |
| Ex. 7 | $Pt_{40}Ru_{37}Si_{20}Zr_3$ | About 160 | — | 40 | 0.46 | 0.7 |
| Ex. 8 | $Pt_{44}Ru_{43}Si_8Nb_5$ | About 50 | — | 40 | 0.47 | 0.6 |
| Ex. 9 | $Pt_{50}Ru_{42}Si_3Hf_5$ | <20 | — | 30 | 0.48 | 0.6 |
| Ex. 10 | $Pt_{50}Ru_{41}Si_3Ti_6$ | <20 | — | 30 | 0.47 | 0.7 |
| Ex. 11 | $Pt_{50}Ru_{37}Si_{10}Ta_3$ | About 90 | — | 40 | 0.48 | 0.8 |
| Ex. 12 | $Pt_{50}Ru_{40}Si_5Cr_5$ | About 100 | — | 40 | 0.47 | 0.6 |

TABLE 1-continued

| | Catalyst composition | Si peak area ratio (%) (1) | Main element T1 peak area ratio A (%) (2) | Main element T2 peak area ratio B (%) (3) | Voltage (V) | Deterioration rate (%) |
|---|---|---|---|---|---|---|
| Ex. 13 | $Pt_{50}Ru_{39}Si_{10}Al_1$ | About 120 | — | 50 | 0.47 | 0.7 |
| Ex. 14 | $Pt_{30}Ru_{50}Si_{0.5}Ni_{15}Al_2$ | <20 | 20 | 40 | 0.50 | 0.7 |
| Ex. 15 | $Pt_{50}Ru_{27}Si_3W_{15}Nb_5$ | About 80 | 60 | 30 | 0.48 | 0.6 |
| Ex. 16 | $Pt_{44}Ru_{45}Si_1W_4Cr_6$ | <20 | 30 | 40 | 0.48 | 0.8 |
| Ex. 17 | $Pt_{50}Ru_{35}Si_3V_{15}Nb_7$ | About 30 | 40 | 40 | 0.49 | 0.9 |
| Ex. 18 | $Pt_{45}Ru_{40}Si_5V_6Zr_4$ | <20 | 40 | 50 | 0.50 | 0.7 |
| Ex. 19 | $Pt_{60}Ru_{30}Si_1Hf_4Nb_5$ | <20 | — | 40 | 0.49 | 0.6 |
| Ex. 20 | $Pt_{44}Ru_{15}Si_1Sn_5W_{20}Ni_{15}$ | <20 | 30 | 30 | 0.51 | 0.6 |
| Comp. Ex. 1 | $Pt_{50}Ru_{50}$ | — | — | — | 0.42 | 0.5 |
| Comp. Ex. 2 | $Pt_{50}Ru_{40}Si_{10}$ | <30 | — | — | 0.43 | 2 |
| Comp. Ex. 3 | $Pt_{45}Ru_{35}Ni_{20}$ | — | 20 | — | 0.44 | 2 |
| Comp. Ex. 4 | $Pt_{50}Ru_{44}W_6$ | — | 30 | — | 0.43 | 2 |
| Comp. Ex. 5 | $Pt_{60}Ru_{33}V_7$ | — | 20 | — | 0.43 | 1.5 |
| Comp. Ex. 6 | $Pt_{48}Ru_{47}Mo_5$ | — | 30 | — | 0.35 | 2 |
| Comp. Ex. 7 | $Pt_{50}Ru_{45}Sn_5$ | — | — | 30 | 0.45 | 2 |
| Comp. Ex. 8 | $Pt_{40}Ru_{37}Zr_3$ | — | — | 20 | 0.30 | 1.5 |
| Comp. Ex. 9 | $Pt_{50}Ru_{45}Nb_5$ | — | — | 30 | 0.40 | 0.6 |
| Comp. Ex. 10 | $Pt_{50}Ru_{47}Hf_5$ | — | — | 30 | 0.43 | 2 |
| Comp. Ex. 11 | $Pt_{50}Ru_{44}Ti_6$ | — | — | 40 | 0.37 | 4 |
| Comp. Ex. 12 | $Pt_{50}Ru_{47}Ta_3$ | — | — | 40 | 0.35 | 2 |
| Comp. Ex. 13 | $Pt_{50}Ru_{45}Cr_5$ | — | — | 40 | 0.34 | 0.8 |
| Comp. Ex. 14 | $Pt_{50}Ru_{49}Al_1$ | — | — | 40 | 0.44 | 1.0 |
| Comp. Ex. 15 | $Pt_{35}Ru_{20}Si_{0.2}Ni_{44.8}$ | <20 | 20 | — | 0.43 | 2.0 |
| Comp. Ex. 16 | $Pt_{60}Ru_{10}Si_{10}Ni_{20}$ | <20 | 20 | — | 0.39 | 1.0 |
| Comp. Ex. 17 | $Pt_{20}Ru_{50}Si_{10}Ni_{20}$ | <20 | 20 | — | 0.30 | 1.5 |
| Comp. Ex. 18 | $Pt_{30}Ru_{35}Si_{25}Ni_{10}$ | <20 | 20 | — | 0.41 | 1.3 |
| Comp. Ex. 19 | $Pt_{74}Ru_{25}Si_3$ (Solution method) | Only oxygen bond | — | — | 0.37 | 0.8 |

(1): Ratio between Si oxidization bond-derived peak and metal bond-derived peak of the same element
(2): Ratio between oxidization bond-derived peak of element T1 (T1 = Ni, W, V, or Mo) and metal bond-derived peak of the same element
(3): Ratio between metal bond-derived peak of element T2 (T2 = Sn, Hf, Zr, Nb, Mo, Ti, Ta, or Cr) and oxygen bond-derived peak of the same element.

TABLE 2

| Element | Range of presence of metal bond-derived peak (eV) | Range of presence of oxygen bond-derived peak (eV) |
| --- | --- | --- |
| Si | 99-100 (2p) | 103-104 (2p) |
| V | 512-513 (2p 3/2) | 516-517 (2p 3/2) |
| W | $31_{ev}$-$34_{ev}$ (4f 7/2) | 36-40 (4f 5/2) |
| Mo | 227-228 (3d 5/2) | 235-237 (3d 5/2) |
| Nb | 202-203 (3d 5/2) | NbO: 203-205 (3d 3/2)<br>$Nb_2O_5$: 209-211 (3d 5/2) |
| Cr | 574 (2p 3/2) | 576-580 (2p 3/2) |
| Zr | 178-179 (3d 5/2) | $ZrO_2$: 184-185 (3d 3/2) |
| Ti | 454 (2p 3/2) | TiO: 455 (2p 3/2), $TiO_2$: 459 (due to overlapping with Ru, there is a high possibility of being unobservable) |
| Ta | 23-24 (4f 7/2) | 27-29 (4f 5/2) |
| Al | 117-118 (2s) | 120-121 (2s) |
| Sn | 493-494 (3d 3/2) | 494-496 (3d 3/2) |
| Hf | 14-15 (4f 7/2) | 17-19 (4f 5/2) |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A catalyst for a fuel cell, comprising fine particles of a metal having an average particle diameter of not more than 10 nm represented by formula:

$$Pt_xRu_ySi_zT1_u$$

wherein T1 represents at least one element selected from the group consisting of nickel (Ni), tungsten (W), vanadium (V), and molybdenum (Mo); x=30 to 90 atomic %; y=0 to 50 atomic %; z=0.5 to 20 atomic %; and u=0.5 to 40 atomic %, wherein the area of a peak attributable to an oxygen bond of silicon (Si) in a spectrum measured by X-ray photoelectron spectroscopy (XPS) is not more than 200% of the area of a peak attributable to a metal bond of a silicon element.

2. The catalyst for a fuel cell according to claim 1, wherein the area of a peak attributable to an oxygen bond of the element T1 in a spectrum measured by X-ray photoelectron spectroscopy (XPS) is not more than 200% of the area of a peak attributable to a metal bond of the same element.

3. The catalyst for a fuel cell according to claim 1, wherein x=30 to 90 atomic %.

4. The catalyst for a fuel cell according to claim 1, wherein y=0 to 45 atomic %.

5. The catalyst for a fuel cell according to claim 1, wherein z=1 to 5 atomic %.

6. The catalyst for a fuel cell according to claim 1, wherein u=1 to 30 atomic %.

7. The catalyst for a fuel cell according to claim 1, which is synthesized by sputtering or vapor deposition.

8. A catalyst for a fuel cell, comprising fine particles of a metal having an average particle diameter of not more than 10 nm represented by formula:

$$Pt_xRu_ySi_zT2_u$$

wherein T2 represents at least one element selected from the group consisting of hafnium (Hf), tin (Sn), zirconium (Zr), niobium (Nb), titanium (Ti), tantalum (Ta), chromium (Cr), and aluminum (Al); x=30 to 90 atomic %; y=0 to 50 atomic %; z=0.5 to 20 atomic %; and u=0.5 to 40 atomic %, wherein the area of a peak attributable to an oxygen bond of silicon Si) in a spectrum measured by X-ray photoelectron spectroscopy (XPS) is not more than 200% of the area of a peak attributable to a metal bond of a silicon element.

9. The catalyst for a fuel cell according to claim 8, wherein the area of a peak attributable to a metal bond of the element T2 in a spectrum measured by X-ray photoelectron spectroscopy (XPS) is not more than 200% of the area of a peak attributable to an oxygen bond of the same element.

10. The catalyst for a fuel cell according to claim 8, wherein x=30 to 90 atomic %.

11. The catalyst for a fuel cell according to claim 8, wherein y=0 to 45 atomic %.

12. The catalyst for a fuel cell according to claim 8, wherein z=1 to 15 atomic %.

13. The catalyst for a fuel cell according to claim 8, wherein u=1 to 30 atomic %.

14. The catalyst for a fuel cell according to claim 8, which is synthesized by sputtering or vapor deposition.

15. A supported catalyst for a fuel cell, comprising a carrier and a catalyst according to claim 1 or 8 supported on the carrier.

16. A membrane electrode assembly comprising a supported catalyst according to claim 15.

17. A fuel cell comprising a membrane electrode assembly according to claim 16.

* * * * *